US006934809B2

(12) United States Patent
Tremblay et al.

(10) Patent No.: US 6,934,809 B2
(45) Date of Patent: Aug. 23, 2005

(54) AUTOMATIC PREFETCH OF POINTERS

(75) Inventors: Marc Tremblay, Menlo Park, CA (US); Shailender Chaudhry, San Francisco, CA (US)

(73) Assignee: Sun Microsystems, Inc., Sunnyvale, CA (US)

( * ) Notice: Subject to any disclaimer, the term of this patent is extended or adjusted under 35 U.S.C. 154(b) by 427 days.

(21) Appl. No.: 10/080,859

(22) Filed: Feb. 22, 2002

(65) Prior Publication Data

US 2003/0163645 A1 Aug. 28, 2003

(51) Int. Cl.[7] ............................................... G06F 12/00
(52) U.S. Cl. .................................... 711/137; 711/170
(58) Field of Search ................................ 711/137, 170

(56) References Cited

U.S. PATENT DOCUMENTS

| | | | |
|---|---|---|---|
| 5,652,858 A | | 7/1997 | Okada et al. |
| 5,680,565 A | * | 10/1997 | Glew et al. ................. 711/205 |
| 5,848,254 A | * | 12/1998 | Hagersten ................... 712/207 |
| 6,076,151 A | * | 6/2000 | Meier .......................... 711/171 |
| 6,151,662 A | | 11/2000 | Christie et al. |
| 6,247,107 B1 | * | 6/2001 | Christie ....................... 711/216 |

OTHER PUBLICATIONS

Chi, Chi–Hung and Cheung, Chin–Ming, "Hardware–Driven Prefetching for Pointer Data References," 1998 International Conference on Supercomputing, Melbourne, Australia, 1998, pp. 379–384.

Cooksey, Robert, Colarelli, Dennis and Grunwald, Dirk, "Content–Based Prefetching: Initial Results," Second International Workshop, IMS 2000, 2000, pp. 33–55.

Liu, Yue, Dimitri, Mona and Kaeli, David R., "Branch–Directed and Pointer–Based Data Cache Prefetching," Journal of Systems Architecture, vol. 45, No. 12–13, 1999, pp. 1047–1073.

* cited by examiner

Primary Examiner—Reginald G. Bragdon
(74) Attorney, Agent, or Firm—Zagorin O'Brien Graham LLP

(57) ABSTRACT

Techniques have been developed whereby likely pointer values are identified at runtime and contents of corresponding storage location can be prefetched into a cache hierarchy to reduce effective memory access latencies. In some realizations, one or more writable stores are defined in a processor architecture to delimit a portion or portions of a memory address space.

33 Claims, 4 Drawing Sheets

AUTOMATIC PREFETCH OF POINTERS

BACKGROUND

1. Field of the Invention

The invention related to prefetch techniques and, in particular, to automatic prefetch based on detection by a processor of likely pointer values.

2. Description of the Related Art

Computer systems typically include, amongst other things, a memory system and one or more processors and/or execution units. The memory system serves as a repository of information, while a processor reads information from the memory system, operates on it, and stores it back. As processor speeds and sizes of memory systems have increased, the mismatch between the ability of the processor to address arbitrary stored information and the ability of the memory system to quickly provide it has increased. To address this mismatch, memory systems are typically organized as a hierarchy using caching techniques that are well understood in the art.

In general, caches can be used to reduce average latency problems when accessing (e.g., reading or writing) main memory. A cache is typically a small, specially configured, high-speed memory that represents a small portion of the information represented in main memory. By placing the cache (small, relatively fast, expensive memory) between main memory (large, relatively slow memory) and the processor, the memory system as a whole is able to satisfy a substantial number of requests from the processor at the speed of the cache, thereby reducing the overall latency of the system. Some systems may define multiple levels of cache.

When the data requested by the processor is in the cache (a "hit"), the request is satisfied at the speed of the cache. However, when the data requested by the processor is not in the cache (a "miss"), the processor must wait until the data is provided from the slower main memory, resulting in greater latency. Typically, useful work is stalled while data is supplied from main memory. As is well known in the art, the frequency of cache misses is much higher in some applications or execution runs than in others. In particular, accesses for some database systems tend to miss in the cache with higher frequency than some scientific or engineering applications. In general, such variation in cache miss frequencies can be traced to differing spatial and temporal locality characteristics of the memory access sequences.

In some applications, particularly those characterized by array accesses, hardware techniques can be employed to predict subsequent accesses. Stride prediction techniques and associated hardware prefetch strategies are one such example. However, in many applications, it is difficult for hardware to discern and predict memory access sequences and software techniques may be alternatively or additionally employed. For example, to increase the likelihood of cache hits and thereby improve apparent memory access latency, some computer systems define instructions for prefetching data from memory to cache. The assumption is that software (e.g., either the programmer or a compiler) may be in a reasonable position to identify prefetch opportunities.

Unfortunately, for certain classes of applications, conventional hardware and software prefetch techniques are not particularly effective. For example, in some applications, performance is dictated by how well a processor can access data represented in data structures that are traversed using pointers. Particularly in complex data structures for which component objects are dynamically-allocated and freed throughout execution and accesses do not exhibit a high degree of spatial and temporal locality, access patterns may be difficult for conventional techniques to discern. Data structures that are typically employed in relational database systems often present such prefetch challenges.

SUMMARY

Accordingly, techniques have been developed whereby likely pointer values are identified at runtime and contents of corresponding storage location can be prefetched into a cache hierarchy to reduce effective memory access latencies. In particular, in some realizations, one or more writable stores are defined in a processor architecture to delimit a portion or portions of a memory address space.

BRIEF DESCRIPTION OF THE DRAWINGS

The present invention may be better understood, and its numerous objects, features, and advantages made apparent to those skilled in the art by referencing the accompanying drawings.

Use of the same reference symbols in different drawings indicates similar or identical items.

DESCRIPTION OF THE PREFERRED EMBODIMENT(S)

The description that follows presents a series of systems, apparati, methods and techniques that facilitate automated prefetch based on detection of memory referencing values in a processor. Exemplary realizations focus on detection of likely pointer values destined for a processor register and include an ability to delimit a relevant range of memory addresses values for automated prefetch using a pair of writable stores. For simplicity of illustration, the description emphasizes values that correspond to a single contiguous range of memory addresses; however, more generally, any subset (including non-contiguous ranges) of addressable storage may be identified in some realizations. One exemplary subset corresponds to a heap from which memory may be dynamically allocated. However, more generally, desirable subsets are exploitation-specific. Similarly, while much of the description herein assumes a single processor, process or thread context, some realizations in accordance with the present invention provide automated prefetch facilities customizable for each processor of a multiprocessor, each process and/or each thread of execution. Accordingly, in view of the above, and without limitation, certain exemplary exploitations are now described.

Figure 1:
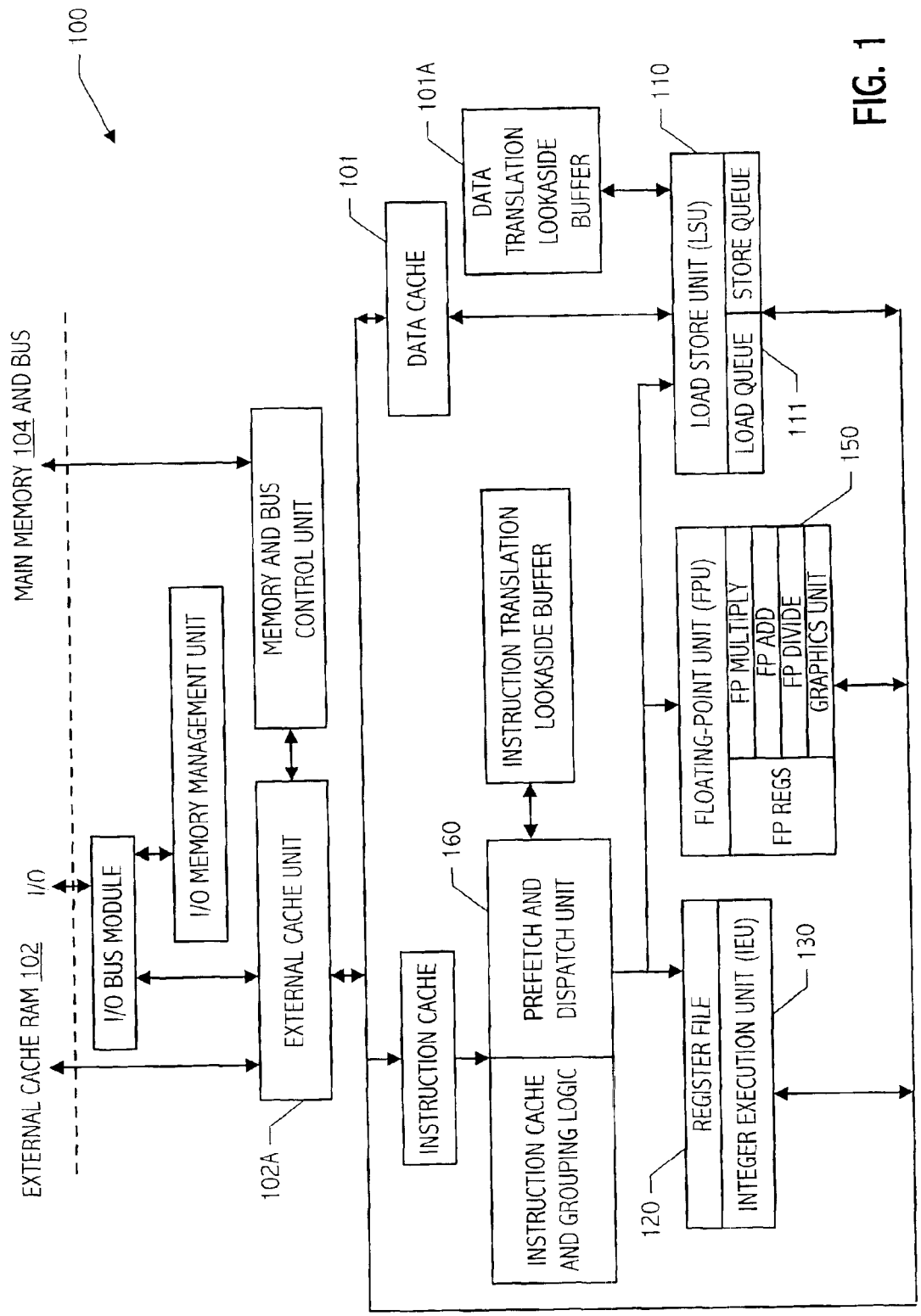
FIG. 1 is block diagram depicting an illustrative processor architecture that includes various levels of cache memory and in which techniques of the present invention may be employed to provide automatic prefetch in accordance with some embodiments of the present invention.

FIG. 1 depicts functional units of an illustrative processor 100 that includes a memory hierarchy for which some memory system latencies may be at least be partially hidden using automated prefetch techniques in accordance with some embodiments of the present invention. The memory hierarchy of processor 100 includes a data cache 101 associated with a load/store unit 110 as well as a next level cache 102, 102A, main memory 104 and any levels (not specifically shown) of additional cache or buffering. The design of processor 100 is reminiscent of that of certain SPARC architecture based processors and includes an illustrative set of execution units, namely load-store unit 110, integer execution unit 130 and floating-point unit 150.

Note that descriptions and/or terminology consistent with the SPARC architecture are used herein purely for illustrative purposes and, based on the description herein, persons of ordinary skill in the art will appreciate exploitations of the present invention suitable for a wide variety of processor implementations and architectures. SPARC architecture based processors are available from Sun Microsystems, Inc, Palo Alto, Calif. SPARC trademarks are used under license and are trademarks or registered trademarks of SPARC International, Inc. in the United States and other countries. Products bearing SPARC trademarks are based upon an architecture developed by Sun Microsystems.

In the illustration of FIG. 1, storage for registers 120 (which may, in some implementations, include renaming facilities, a reorder buffer or other out-of-order and/or speculative execution facilities) is integrated with integer execution unit 130. Other implementations may employ other forms or implementations of storage for architectural states. Suitable forms and storage implementations are architecture- and processor implementation-specific. However, in any case, facilities are provided in accordance with the present invention to identify instructions (or operations) that target storage suitable for referencing (or addressing into) memory and further to detect correspondence of values destined for such storage with a definable subset (or portion) of such memory. Based on such target identification and correspondence detection, a prefetch may be initiated. For example, in the context of FIG. 1, a prefetch operation may be inserted into an available position of load queue 111.

Note that a prefetch need not be initiated in all such cases. For example, a prefetch that targets a line already resident in cache (e.g., already in data cache 101) will typically be forgone. Similarly, an already queued load or store operation may obviate a prefetch if the queued load or store operation targets the same cache line as the desired prefetch. In some implementations, it may be desirable to forgo a prefetch when load queue depth or memory access bandwidth is insufficient. In general, any of a variety of conventional load/store techniques may be employed in a particular implementation and such techniques are well understood in the art. In any case, when initiated, such an automatically-generated prefetch need not (and typically does not) correspond to any prefetch instruction in an instruction stream and the prefetch can be automatically-generated for instruction sequences in which conventional stride-prediction techniques prove inadequate. That said, nothing herein precludes combination of techniques or facilities in accordance with the present invention with software-assisted prefetch (e.g., compiler inserted prefetch instructions) and/or conventional hardware-assisted prefetch.

To access data in a typical load/store processor architecture, program instructions (e.g., load-type instructions and store-type instructions) will typically operate on a fully-specified pointer value stored in a register. A load instruction,

LD [R21], R22 that loads into register R22 the contents of memory identified by the address stored in register R21 is typical. In general, the pointer value that resides in R21 may be the result of a previous load (e.g., in the case of a linked-list traversal), may be the result of an address computation or may be the byproduct of some other operation defined by a particular processor architecture. In each case handled by a particular realization, we employ techniques in accordance with the present invention to detect that a value destined for a register (e.g., for register R21) matches a pattern that suggests that it is a pointer value.

While techniques in accordance with the present invention are not necessarily limited to contiguous ranges of memory addresses, let alone to a single contiguous range, many aspects will be understood in accordance with detection patterns that correspond to a single contiguous range of memory addresses. Suitable encoding and comparison techniques for such patterns are straight-forward. Nonetheless, based on the description herein, persons of ordinary skill in the art will appreciate suitable extensions to other patterns that may be employed to delimit other subsets of addressable storage.

In view of the foregoing and without limitation, data identified or referenced by pointers often reside in a region of memory that can be described by a simple range. Indeed, one may determine or discover that most pointers to interesting data in a heap appears in locations that correspond to the range of possible values from 0xFFFF0000 to 0xFFFFFFFF. Of course, values that define the aforementioned range are purely arbitrary. In general, such a range may correspond to current bounds of the heap itself or to a particular portion thereof. Whatever the particular range, values destined for registers of a processor may be compared against the range to identify likely pointer values.

Figure 2:
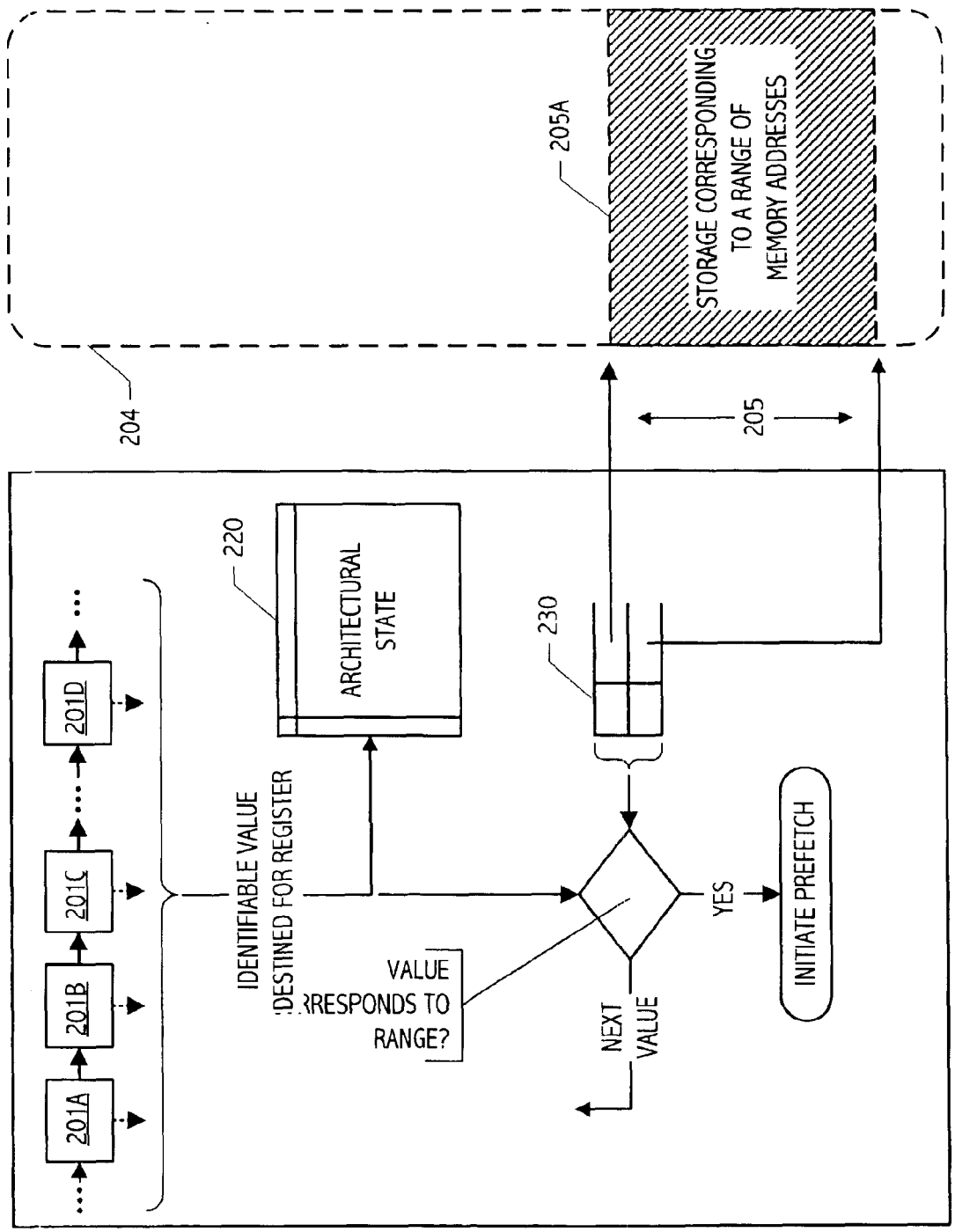
FIG. 2 depicts operation of a memory referencing value detection mechanism in accordance with some embodiments of the present invention.

FIG. 2 illustrates operation of an illustrative memory referencing value detection mechanism. At any of a variety of execution stages (e.g., 201A, 201B, 201C . . . 201D) in a processor 200, an executing instruction or operation may generate a value destined for a register. In general, a processor-specific set of instructions, operations or variants thereof can be identified, which target such registers (not specifically shown) of processor 200. Of course, in many processor implementations, architectural techniques may be employed to rename registers and/or to provide speculative or out-of-order execution. Accordingly, instructions or operations that target registers of a processor will be understood to encompass those instructions or operations that target architectural state of the processor, regardless of how such state may be transiently or speculatively represented. Based on the description herein, persons of ordinary skill in the art will appreciate relevant sets of instructions or operations and relevant repositories of architectural state for any particular processor exploitation of the present invention.

FIG. 2 illustrates comparison of values destined for a representation 220 of architectural state against a range 205 of addresses defined by a pair of stores 230 that identify corresponding subset 205A of memory 204 addressable by processor 200. As previously described, subset 205A of addressable memory 204 may correspond to a heap or to some other relevant subset of addressable memory. In some realizations, subset 205A may correspond to a range (or to ranges) of addresses employed in some performance critical data structure. In some realizations, processor representation of the pattern description (such as by stores 230) is writable by application code so as to allow programmer control of the focus of an automatic prefetch mechanism. In other realizations, definition of the pattern description may be under control of an execution or operating environment. For example, the pattern description may be maintained by a memory allocator to correspond to a current extent of a heap.

Figure 3:
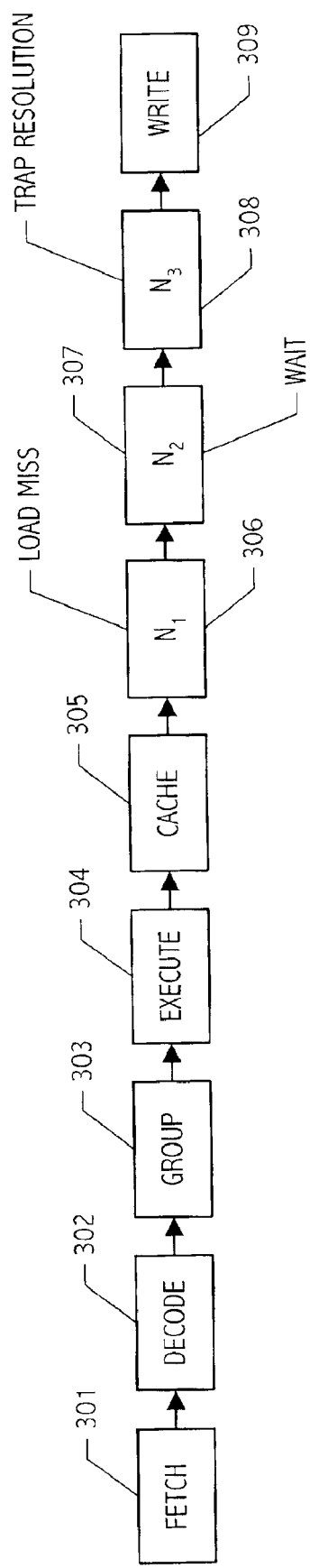
FIG. 3 depicts pipeline stages in the execution of instructions of an illustrative processor and identifies a variety of suitable stages of in pipelined execution at which an identification of likely pointer values destined for a register may be performed.

In general, potential pointer values may be produced at any of a variety of execution stages (e.g., 201A, 201B, 201C . . . 201D) and suitable stages are typically processor and instruction or operation specific. FIG. 3 depicts pipeline stages in the execution of instructions of an illustrative SPARC architecture based processor and identifies a variety of suitable stages of pipelined execution at which an identification of likely pointer values destined for a register may be performed. In particular, FIG. 3 illustrates a pipeline with nine-stages: fetch 301, decode 302, grouping 303, execution 304, cache access 305, load miss 306, integer pipe wait 307, trap resolution 308 and writeback 309. Integer instructions are executed and virtual addresses calculated in execution stage 304. In stage 305, the data cache (e.g., data cache 101 and supporting data TLB 101A, see FIG. 1) is accessed and hits and misses are determined. During later stages, a load miss enters a load buffer (e.g., load queue 111, see FIG. 1), wait conditions and traps (if any) are resolved and finally in stage 309, results are written to registers (e.g., to register file 120, see FIG. 1) and instructions are committed.

In the illustrative context of FIG. 3, comparison with a pattern (or patterns) that correspond(s) to a subset of addressable memory may be performed beginning at execution stage 304. In general, initiation of a prefetch occurs as soon as possible thereafter (e.g., during execution stage 304 itself), or may be delayed until the register-destined value is actually written to register storage in stage 309. In some realizations, the particular stage of execution at which values suitable for comparison against the pattern or range are available may vary from instruction-to-instruction (or operation-to-operation) or from execution instance to execution instance. For example, a value loaded from memory into register storage by an execution instance of a load operation may be available after data cache access (stage 305) or later, such as after a cache line fill. On the other hand, results of an arithmetic calculation (e.g., as part of an address calculation) may be available at stage 304. In general, the particular execution stages and on-chip computational structures at which register destined result values may be compared against a pattern descriptive of a subset addressable memory are instruction, processor and implementation dependent. Accordingly, the particular timing of a check for likely pointer values and the placement of computational structures to perform such checks will vary from realization to realization.

A wide variety of design alternatives may be employed in the implementation of processor realizations in accordance with the present invention. For example, in some realizations, likely pointer value checks may be performed essentially indiscriminately on all register bound values. For example, in certain processor architectures, result bus traffic may be observed. In other realizations, likely pointer value checks may be implemented at certain computational structures or pipeline stages. Alternatively, or in addition, results of certain instructions or operations may be the focus likely pointer value checks. In such cases, likely pointer value checks may coordinate with instruction dispatch and result commitment logic. Whatever the particular design, a processor in accordance with some embodiments of the present invention initiates prefetch of some data from memory based on detection, by the processor, of a likely pointer value destined for a register or other representation of architectural state.

Figure 4:
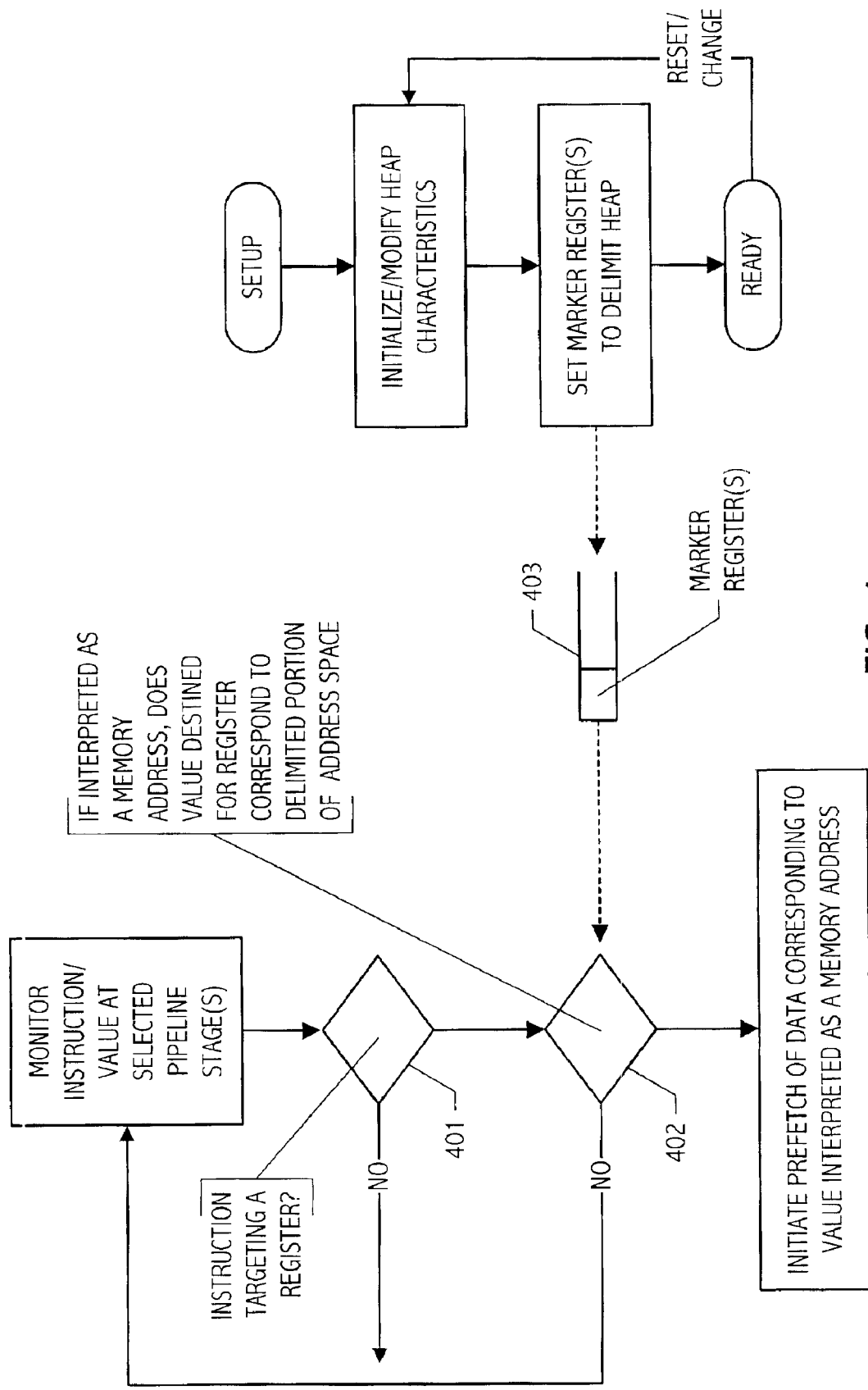
FIG. 4 is a flow chart depicting operation of a memory referencing value detection mechanism in accordance with some embodiments of the present invention. The flow chart illustrates an illustrative exploitation in which one or more marker registers are employed to delimit a heap.

FIG. 4 is a flow chart depicting operation of a memory referencing value detection mechanism in accordance with some embodiments of the present invention. As before, values are monitored at an appropriate computational structure or pipeline stage of a processor exploitation of the invention. In the particular illustration of FIG. 4, results of a subset of instructions are targeted for likely pointer value detection. Therefore, two checks are emphasized. First, instructions or operations that are part of a register targeting subset of all instructions or operations are identified (401). Register targeting instructions are easily recognized in most instructions set architectures. For example, in some processor implementation, instructions or operations that target a register may be marked during (or as a result of) decode. Of course, in some realizations (not specifically illustrated in FIG. 4), a subset of register targeting instructions may be the focus of likely pointer value detection. For example, certain arithmetic operations may be predominately employed as a final (or later stage) step in address calculation instruction sequences generated by compilers. Accordingly, some implementations may focus likely pointer value detection on result values of such operations. Alternatively or additionally, a subset of registers may be disproportionately used for storage of pointer values and likely pointer value detection may be appropriately focused on instructions that target such registers.

After identification (if any) of a relevant instruction type (e.g., a register targeting instruction), particular result values are compared against a pattern that is descriptive of an interesting subset of addressable memory. The interesting subset can be entirely implementation specific. For example, the flow chart of FIG. 4 illustrates an illustrative exploitation in which one or more marker registers are employed to encode a pattern that delimits a heap. Other portions of addressable memory may be desirable in other exploitations. In general, comparison of a possible pointer value against a base and bound or base and offset encoding are each quite simple, and for certain well behaved base, bound and offsets, comparisons may be computed particularly efficiently. While a single contiguous range of addressable memory locations is suitable for many implementations, other implementations may provide plural ranges (and associated storage, such as in the form of sets of marker registers 403) if desired. For example, some realizations may support potentially distinct ranges for multiple threads or processes or to support non-contiguous subsets of addressable memory.

In general, it is desirable for the particular subset (or range) of addressable memory to be definable at runtime. FIG. 4 illustrates a particular exploitation of such a runtime facility for maintaining a pattern (encoded in one or more marker registers 403) to support detection of likely pointer values that correspond to a current extent of a heap. In general, the contents of such marker registers or other suitable encodings may be initialized to correspond to an interesting subset of addressable memory and, in some realizations, such encodings may be updates as the interesting subset changes (e.g., as a heap is expanded or contracted). Accordingly, some realizations marker registers 403 are as storage writable under program control, e.g., machine specific registers. Nonetheless, in some exploitations for which an interesting subset of addressable storage may be defined apart from a particular application of program, a fixed subset or range encoding may be suitable.

While some of the description herein has been in the context of values that may be intercepted and compared at various pipeline stages, other realizations in accordance with some embodiments of the present invention may scan register or other architectural state storage for likely pointer values.

While the invention has been described with reference to various embodiments, it will be understood that these embodiments are illustrative and that the scope of the invention is not limited to them. Many variations, modifications, additions, and improvements are possible. For example, while much of the description herein has focused on the illustrative context of prefetch and addressable memory, techniques of the present invention may be applied to pre-executable activity for any of a variety of addressable resources that may be employed in a computing environment. As described, techniques of the present invention may be employed in combination with other prefetch facilities, be they hardware- or software-oriented. Any of a variety of suitable patterns may be encoded to identify a subset of addressable storage and any of a variety of suitable physical structures may employed to encode same.

In general, a processor that includes an automatic prefetch facility may be made by defining thereon, during fabrication of an integrated circuit, (i) at least one writable store of the processor suitable for delimiting a subset of addressable memory and (ii) likely pointer value detection logic coupled to the at least one writable store and responsive to data values destined for register storage of the processor.

Although the terms "instruction" and "operation" may be used in some contexts to identify different things, e.g., instructions in accordance with an instruction set and operations (microcode or otherwise), such distinctions are not significant in the context of the present invention. Accordingly, while the term instruction is typically used in the claims, persons of ordinary skill in the art will understand the scope of such term shall include instructions, operations or any similar functional encoding such as an opcode, bytecode, etc. in a general sense, without regard to distinctions that others may employ. Similarly, while pointers values (and therefore detection of likely pointer values) will generally be defined in virtual address space, other definitions (e.g., physical addresses, linear addresses, indexes, etc.) and encodings may be suitable for certain exploitations.

More generally, realizations in accordance with the present invention have been described in the context of particular embodiments. These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A processor comprising:

a register;

at least one writable store that, based on one or more values encoded therein, delimits a subset of memory addresses, wherein, at runtime, the delimited subset covers at least one range of addresses from which memory is dynamically allocated; and a prefetch facility that initiates a prefetch based on correspondence of a value destined for the register with the delimited subset of memory addresses.

2. The processor of claim 1, further comprising:

logic responsive to an address calculation, the logic initiating the prefetch based on a match between the calculated address and the delimited subset of memory addresses.

3. The processor of claim 1, further comprising:

logic responsive to storage of a value into the register, the logic initiating the prefetch based on a match between the stored value and the delimited subset of memory addresses.

4. The processor of claim 1, further comprising:

address match logic that initiates the prefetch based on a match between the value destined for the register and the delimited subset of memory addresses, wherein the match is performed at a pipeline stage between address calculation and storage to the register.

5. The processor of claim 1, wherein the value destined for the register is destined for an architectural register or any reorder buffer state corresponding thereto.

6. The processor of claim 1, wherein the register is a register of an operative register set.

7. The processor of claim 6, wherein the operative register set corresponds to a particular thread or process; and wherein the delimited subset of memory addresses correspond to locations dynamically allocated by or for the particular thread or process.

8. The processor of claim 1, wherein the at least one writable store includes a pair of registers whose contents delimit a contiguous range of memory addresses.

9. The processor of claim 1, wherein, at runtime, the delimited subset covers a range of memory addresses that correspond to a heap.

10. The processor of claim 1, wherein the prefetch is performed by the processor without presence of a corresponding prefetch instruction in an instruction sequence.

11. The method as in claim 1, wherein, at runtime, the delimited subset covers at least one range of addresses coextensive with a heap.

12. The method as in claim 1, wherein the delimited subset covers a programmable range of addresses.

13. A processor that automatically prefetches data from memory based on detection, by the processor, of a likely pointer value destined for a register of the processor, wherein the processor detects the likely pointer value by comparing a value destined for the register with a delimited subset of memory addresses, and wherein, at runtime, the delimited subset covers at least one range of addresses from which memory is dynamically allocated.

14. The method as in claim 11, wherein, at runtime, the delimited subset covers at least one range of addresses coextensive with a heap.

15. The method as in claim 11, wherein the delimited subset covers a programmable range of addresses.

16. A method of automatically prefetching at least some data in a computer system, the method comprising:

executing an instruction sequence including a first instruction that targets a register; and initiating, without a corresponding prefetch instruction in the instruction sequence, prefetch of data corresponding to a likely pointer value destined for the register as a result of the execution of the first instruction; and matching the likely pointer value against contents of at least one writable store that delimits a subset of addressable memory, wherein the delimited subset covers at least one range of addresses from which memory is dynamically allocated by or in the course of the instruction sequence.

17. The method of claim 16, further comprising:

executing a memory access instruction that uses contents of the register as an address value, wherein prior performance of the prefetch allows the memory access instruction to be serviced from cache.

18. The method of claim 16, wherein the at least one writable store includes a pair of registers that encode bounds of at least one contiguous portion of the delimited subset of addressable memory.

19. The method of claim 16, further comprising:

initializing the at least one writable store to correspond to bounds of a heap.

20. The method of claim 16, further comprising:

initializing the at least one writable store to correspond to a range of memory addresses used for storage of lock states.

21. The method of claim 16, further comprising:

prefetching at least some other data based on a prefetch instruction in the instruction sequence.

22. The method of claim 16, further comprising:

prefetching at least some other data based on a prediction of memory access strides.

23. The method as in claim 16, wherein, at runtime, the delimited subset covers at least one range of addresses coextensive with a heap.

24. The method as in claim 16, wherein the delimited subset covers a programmable range of addresses.

25. A method of operating a processor comprising:

detecting a likely pointer value destined for a register of the processor; wherein the likely pointer value detection includes comparing against a predefined address pattern that delimits a subset of memory from which storage is dynamically allocated; and prefetching from memory data corresponding to the likely pointer value.

26. The method of claim 25, wherein the likely pointer value detection includes comparing data values being stored into a register file against a predefined address pattern.

27. The method of claim 25, wherein the likely pointer value detection includes scanning values stored in a register file or reorder buffer and comparing the scanned values against the predefined address pattern.

28. The method of claim 25, wherein the processor supports speculative execution; and wherein the likely pointer value detection includes comparing against the predefined address pattern, register states that become non-speculative.

29. The method of claim 25, wherein the likely pointer value detection includes comparing against a predefined address pattern, address values calculated on execution of certain instructions of an instruction set.

30. The method of claim 25, wherein the predefined address pattern is defined by contents of at least one writable store of the processor.

31. The method of claim 25, wherein the predefined address pattern delimits one or more contiguous ranges of memory addresses.

32. An apparatus comprising:

a processor; and means for automatically prefetching certain data from memory based on detection of a likely pointer value destined for a register of the processor, wherein the processor detects the likely pointer value by comparing a value destined for the register with a delimited subset of memory addresses, and wherein, at runtime, the delimited subset covers at least one range of addresses from which memory is dynamically allocated.

33. A method of making a processor that includes an automatic prefetch facility, the method comprising:

during fabrication of an integrated circuit, defining thereon at least one writable store of the processor suitable for delimiting, at runtime, a subset of addressable memory from which storage is dynamically allocable; and during fabrication of the integrated circuit, defining thereon likely pointer value detection logic coupled to the at least one writable store and responsive to data values destined for register storage of the processor.

* * * * *